United States Patent
Mukherjee et al.

(10) Patent No.: US 11,062,047 B2
(45) Date of Patent: Jul. 13, 2021

(54) SYSTEM AND METHOD FOR DISTRIBUTED COMPUTATION USING HETEROGENEOUS COMPUTING NODES

(71) Applicant: Tata Consultancy Services Limited, Mumbai (IN)

(72) Inventors: Arijit Mukherjee, Kolkata (IN); Soma Bandyopadhyay, Kolkata (IN); Arijit Ukil, Kolkata (IN); Abhijan Bhattacharyya, Kolkata (IN); Swarnava Dey, Kolkata (IN); Arpan Pal, Kolkata (IN); Himadri Sekhar Paul, Kolkata (IN)

(73) Assignee: Tata Consultancy Services Ltd., Mumbai (IN)

(*) Notice: Subject to any disclaimer, the term of this patent is extended or adjusted under 35 U.S.C. 154(b) by 84 days.

(21) Appl. No.: 14/900,061

(22) PCT Filed: Jun. 9, 2014

(86) PCT No.: PCT/IN2014/000386
§ 371 (c)(1),
(2) Date: Dec. 18, 2015

(87) PCT Pub. No.: WO2014/207759
PCT Pub. Date: Dec. 31, 2014

(65) Prior Publication Data
US 2016/0140359 A1 May 19, 2016

(30) Foreign Application Priority Data

Jun. 20, 2013 (IN) .......................... 2095/MUM/2013

(51) Int. Cl.
*G06F 9/50* (2006.01)
*H04L 29/06* (2006.01)
(Continued)

(52) U.S. Cl.
CPC ...... *G06F 21/6245* (2013.01); *G06F 21/6263* (2013.01); *H04L 43/08* (2013.01);
(Continued)

(58) Field of Classification Search
CPC . G06F 21/6245; G06F 21/6263; H04L 63/10; H04L 43/08; H04L 67/10
See application file for complete search history.

(56) References Cited

U.S. PATENT DOCUMENTS 6,363,495 B1 * 3/2002 MacKenzie ......... G06F 11/1482
714/37
6,862,731 B1 * 3/2005 Roth ..................... G06F 9/5066
709/226
(Continued)

FOREIGN PATENT DOCUMENTS

WO WO-2012/143931 10/2012

OTHER PUBLICATIONS

Chaiken, Ronnie, et al. "SCOPE: easy and efficient parallel processing of massive data sets." Proceedings of the VLDB Endowment 1.2 (2008): 1265-1276.*
(Continued)

*Primary Examiner* — Michael Simitoski
(74) *Attorney, Agent, or Firm* — Finnegan, Henderson, Farabow, Garrett & Dunner LLP

(57) ABSTRACT

This disclosure relates generally to the use of distributed system for computation, and more particularly, relates to a method and system for optimizing computation and communication resource while preserving security in the distributed device for computation. In one embodiment, a system and method of utilizing plurality of constrained edge devices for distributed computation is disclosed. The system enables integration of the edge devices like residential gateways and smart phone into a grid of distributed com-
(Continued)

putation. The edged devices with constrained bandwidth, energy, computation capabilities and combination thereof are optimized dynamically based on condition of communication network. The system further enables scheduling and segregation of data, to be analyzed, between the edge devices. The system may further be configured to preserve privacy associated with the data while sharing the data between the plurality of devices during computation.

3 Claims, 3 Drawing Sheets

(51) Int. Cl.
| | |
|---|---|
| G06F 21/62 | (2013.01) |
| H04L 12/26 | (2006.01) |
| H04L 29/08 | (2006.01) |
| H04L 9/00 | (2006.01) |
| H04W 12/02 | (2009.01) |

(52) U.S. Cl.
CPC .......... *H04L 67/10* (2013.01); *H04L 63/0407* (2013.01); *H04W 12/02* (2013.01)

(56) References Cited

U.S. PATENT DOCUMENTS

| | | | | |
|---|---|---|---|---|
| 7,010,789 | B1* | 3/2006 | Kimelman | G06F 9/5066 718/100 |
| 7,748,027 | B2* | 6/2010 | Patrick | G06F 21/62 709/224 |
| 8,010,668 | B1* | 8/2011 | Rothstein | H04W 4/18 709/224 |
| 8,190,938 | B2* | 5/2012 | Nurminen | G06F 1/3203 713/323 |
| 8,972,725 | B2* | 3/2015 | Arun | H04L 41/5041 713/166 |
| 9,253,113 | B2* | 2/2016 | Vasudevan | H04L 47/70 |
| 9,531,580 | B1* | 12/2016 | Seaman | G06F 21/6218 |
| 2003/0135613 | A1* | 7/2003 | Yoshida | H04L 29/12113 709/224 |
| 2006/0031506 | A1* | 2/2006 | Redgate | H04L 29/06 709/226 |
| 2006/0069832 | A1* | 3/2006 | Imaizumi | G06F 13/4217 710/110 |
| 2006/0085420 | A1* | 4/2006 | Hwang | G06F 11/3419 |
| 2006/0143688 | A1* | 6/2006 | Futoransky | H04L 63/102 726/1 |
| 2008/0059489 | A1* | 3/2008 | Han | G06F 16/245 |
| 2009/0099860 | A1* | 4/2009 | Karabulut | G06F 21/604 705/325 |
| 2010/0017870 | A1* | 1/2010 | Kargupta | H04L 63/1408 726/14 |
| 2010/0153542 | A1* | 6/2010 | Arimilli | G06F 9/5088 709/224 |
| 2010/0242120 | A1* | 9/2010 | Anderson | G06Q 10/06 726/27 |
| 2011/0131499 | A1* | 6/2011 | Ferris | G06F 16/954 715/736 |
| 2011/0145621 | A1* | 6/2011 | Albano | G06F 1/329 713/340 |
| 2011/0321117 | A1* | 12/2011 | Nestler | G06F 21/604 726/1 |
| 2012/0159506 | A1* | 6/2012 | Barham | G06F 9/5044 718/104 |
| 2012/0166514 | A1* | 6/2012 | Mathew | G06F 9/505 709/201 |
| 2012/0198251 | A1* | 8/2012 | Boldryev | G06F 9/5088 713/310 |
| 2012/0233486 | A1* | 9/2012 | Phull | G06F 9/5083 713/375 |
| 2012/0282945 | A1 | 11/2012 | Guha et al. | |
| 2012/0297441 | A1* | 11/2012 | Boldyrev | G06F 21/6245 726/1 |
| 2014/0047079 | A1* | 2/2014 | Breternitz | G06F 9/5072 709/220 |
| 2014/0108648 | A1* | 4/2014 | Nelke | H04L 41/5054 709/224 |
| 2015/0199208 | A1* | 7/2015 | Huang | G06F 9/45533 718/1 |
| 2017/0139736 | A1* | 5/2017 | Messerli | G06F 9/505 |

OTHER PUBLICATIONS

Dean, Jeffrey, and Sanjay Ghemawat. "MapReduce: simplified data processing on large clusters." Communications of the ACM 51.1 (2008): 107-113.*
Lu, Rongxing, Xiaodong Lin, and Xuemin Shen. "SPOC: A secure and privacy-preserving opportunistic computing framework for mobile-healthcare emergency." IEEE Transactions on Parallel and Distributed Systems 24.3 (2013): 614-624.*
Sharifi, Mohsen, Somayeh Kafaie, and Omid Kashefi. "A survey and taxonomy of cyber foraging of mobile devices." IEEE Communications Surveys & Tutorials 14.4 (2012): 1232-1243.*
Bohli, Jens-Matthias, et al. "Security and privacy-enhancing multicloud architectures." IEEE Transactions on Dependable and Secure Computing 10.4 (2013): 212-224. (Year: 2013).*
Kissner, Lea, and Dawn Song. "Privacy-preserving set operations." Annual International Cryptology Conference. Springer, Berlin, Heidelberg, 2005. (Year: 2005).*
Ho, Choi Yun et al. Korea Invention Application Publication KR 2006-0082622 A, published Jul. 19, 2006. (Year: 2006).*
Ho, Choi Yun et al. Korea Invention Application Publication KR 2006-0082622 A, published Jul. 19, 2006 (machine translation of Description). (Year: 2006).*
Lioupis, Dimitris, Dionysia Psihogiou, and Michalis Stefanidakis. "Exporting processing power of home embedded devices to global computing applications." 12th Euromicro Conference on Parallel, Distributed and Network-Based Processing, 2004. Proceedings . . . IEEE, 2004. (Year: 2004).*
Wei, Zhiqiang, et al. "A residential gateway architecture based on cloud computing." 2010 IEEE International Conference on Software Engineering and Service Sciences. IEEE, 2010. (Year: 2010).*
Zhang, W. et al., "GP²S Generic Privacy-Preservation Solutions for Approximate Aggregation on Sensor Data," *6th Annual IEEE International Conference on Pervasive Computing and Communications*, Mar. 17-21, 2008, Hong Kong, 6 pages.
Ukil, A., "Context Protecting Privacy Preservation in Ubiquitous Computing," *2010 International Conference on Computer Information Systems and Industrial Management Applications (CISIM)*, Oct. 8-10, 2010, Krackow; 6 pages.
Ukil, A., "Privacy Preserving Data Aggregation in Wireless Sensor Networks," *2010 6th International Conference on Wireless and Mobile Communications (ICWMC)*, Sep. 20-25, 2010, Valencia, 6 pages.
Sen, J. "Secure and Privacy-Preserving Data Aggregation Protocols for Wireless Sensor Networks" Chapter 7 in *Cryptography and Security in Computing*, Published by INTECH OPEN, Croatia (2012); 33 pages.
Ukii, A., "Security and Privacy in Wireless Sensor Networks," Chapter 23 in *Smart Wireless Sensor Networks*, Published by INTECH OPEN (2010); 26 pages.
He, W. et al., "PDA: Privacy-preserving Data Aggregation in Wireless Sensor Networks," *26th IEEE International Conference on Computer Communications*, INFOCOM 2007, May 6-12, 2007, Anchorage, AK; 9 pages.

* cited by examiner

SYSTEM AND METHOD FOR DISTRIBUTED COMPUTATION USING HETEROGENEOUS COMPUTING NODES

PRIORITY CLAIM

This application is a national stage application of International Application No. PCT/IN 2014/000386, filed Jun. 9, 2014, and claims priority to Indian Application No. 2095/MUM/2013, filed Jun. 20, 2013, the content of both of which are incorporated by reference in their entirety.

TECHNICAL FIELD

This disclosure relates generally to the use of distributed system for computation, and more particularly, relates to a method and system for optimizing computation and communication resource while preserving security in the distributed device for computation.

BACKGROUND

Conventional computation involves use of a single computer. However, single computer sometime proves inefficient when performing certain complex computations. The limitation of using single computer for complex computations is usually resolved by adapting a distributed computing environment.

The advancement in networking system enabled computer systems that are distributed geographically to remain connected and perform as a part of grid. With this, the distributed computing techniques were ostensibly able to solve complex computational problems. However, whenever the distributed computing environment was observed to encompass the edge devices which may be constrained in terms of computing power, memory, network bandwidth, as computing resources, it required adopting efficient communication methods to share the scheduled data for their subsequent processing.

While employing idle edge nodes for opportunistic computation, sharing of private data poses a formidable challenge. Hence, ensuring data privacy while distributing data in an optimized manner as a part of computation became one of the major concerns to be redressed. Arbitrary privacy-preserving mechanism can lead to either high computational cost or low privacy preservation and requires a method for effective privacy preservation of data to ensure minimal privacy breach while performing distributed computation in a distributed computing environment.

Understandably, additional computational nodes are generally needed for parallel computation. One can use smart devices as non-dedicated additional computational nodes. The smart devices can be used successfully as computational nodes as they remain idle for a large percentage of time. However, given that the smart devices are constrained in terms of computation capabilities, memory and bandwidth usage, and power, these parameters require punctilious consideration before engaging them as a part of grid for parallel/distributed computing.

SUMMARY

Embodiments of the present disclosure present technological improvements as solutions to one or more of the above-mentioned technical problems recognized by the inventors in conventional systems. For example, in one embodiment, a device for distributed computation, wherein the device is configured to use in addition to backend server nodes, a plurality of edge devices for optimizing resource usage of resource-constrained sensors has been disclosed. The device may comprise a cluster monitoring module. The cluster monitoring module configured to receive data for computation. The data for the computation may be shared with the compute nodes including the plurality of edge devices participating in the distributed computing environment or grid. The plurality of edge devices may be constrained in terms of available bandwidth and energy. The device may further comprise a privacy module. The privacy module may enable privacy measurement by performing sensitivity analysis for the data and the edge devices. The device may further comprise a communication module. The communication module may be configured to transfer the data to the plurality of edge devices for efficient load distribution during computation. The communication module may also be configured to preserve privacy, while the data is transferred to the plurality of edge devices. The communication module may further be configured to optimize bandwidth usage and energy consumption during the transfer of the data over a communication network.

In another embodiment, a system for distributed computation over a communication network is disclosed. The system, herein, comprises of a cluster monitoring module that is configured to receive data for computation, a privacy module that is configured to provide privacy measurement for the data received from the cluster monitoring module and the communication module that is configured to transfer data for efficient load distribution during computation while ensuring privacy preservation during such data transfer and optimizing bandwidth usage and energy consumption over the communication network. One preferred embodiment of the present disclosure comprises plurality of edge devices that interacts with said system for optimizing computation and communication resource while preserving security in the distributed device environment.

In one significant aspect, one or more of the cluster monitoring module, the privacy module and the communication module may be hosted on one or more of the plurality of edge devices that are communicating with the system over the communication network.

In yet another embodiment, a method for distributed computation, wherein in addition to backend server nodes a plurality of edge devices are used for distributed computation, is disclosed. According to the disclosure, the bandwidth and energy usage of communication network for a plurality of edge devices may be efficiently optimized. Firstly, data may be received for computation. The data may be received from at least one edge device selected from the plurality of edge devices. The method then comprises segregation of the data into smaller data sets of varying size, based on a list of partitions created by a cluster monitoring module. The smaller data sets may further be allocated to the plurality of edge devices for subsequent analysis. Further, bandwidth and energy usage may be optimized during allocation of the smaller data sets to the plurality of devices, while preserving privacy during said allocation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary

DETAILED DESCRIPTION

Figure 1:
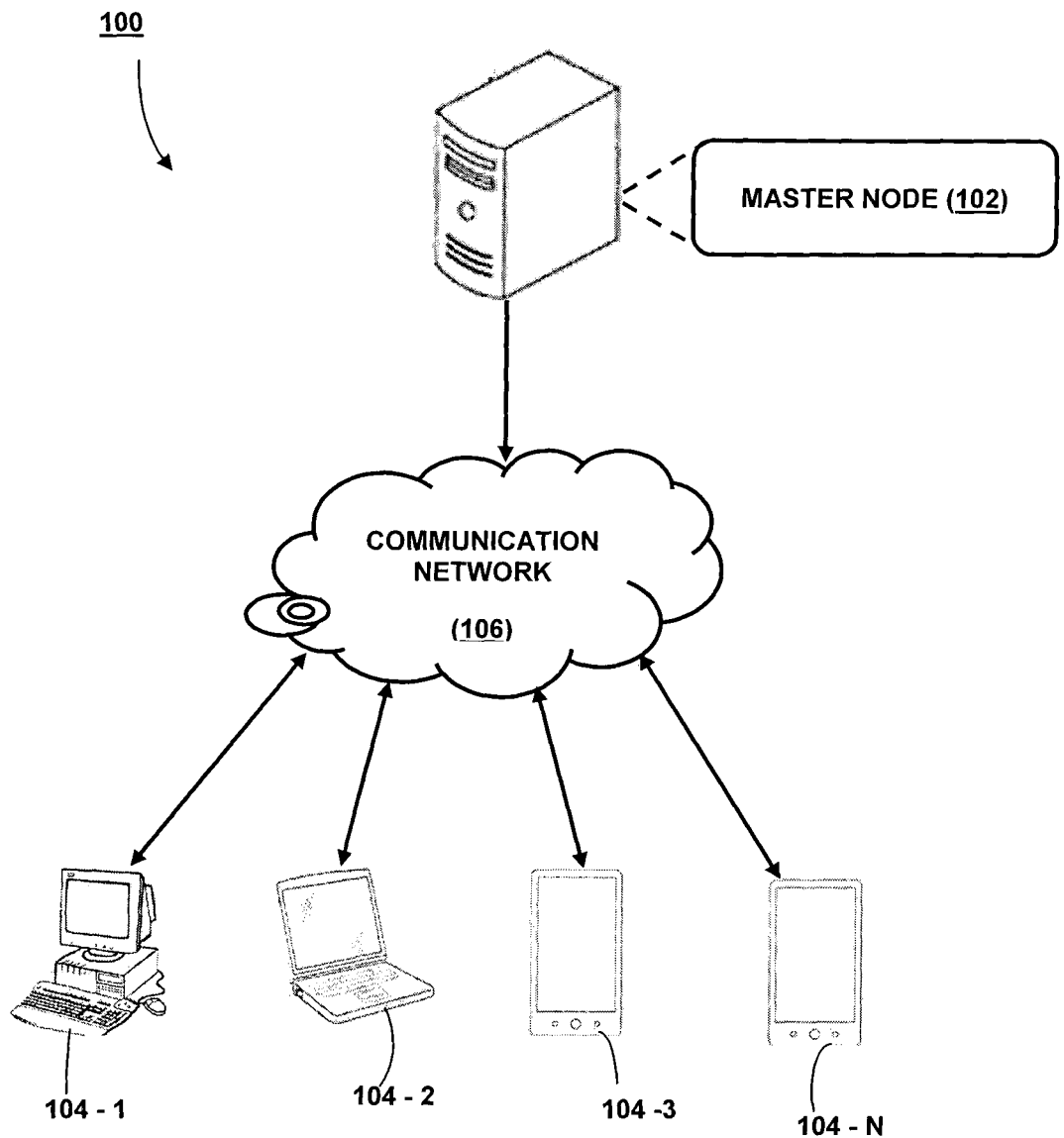
FIG. 1 illustrates a distributed computation environment in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system, device and method for distributed computation, wherein a plurality of edge devices are used along with backend server nodes for effective optimization of resource usage amongst the resource constrained sensors within a distributed computation environment. The present subject matter enables utilization of processing capability of edge devices by applying a low overhead communication and computation mechanism for distributing data, while at the same time preserving privacy of distributed data. The edge devices may be smart phones or Personal Digital Assistants (PDA's) and any such hand-held device that may be connected using constrained residential gateways, and may form a part of IoT (Internet of Things). As indicated above, the disclosure enables resolving privacy concerns associated with the distributed computing using edge devices.

In one aspect, the present subject matter enables a user to use computation power of edge devices, like smart phone, PDA's or residential gateways, for distributed computing. The edge devices like residential gateways, PDA's and smart phones may integrate into an existing grid, or form a new grid for distributed computation. The integration of edge devices into the grid may enable utilization of processing power of the edges devices that are idle in analyzing data. Utilization of the residential gateways and smart phones may also help in cost optimization associated with the distributed computation.

According to the present disclosure, the edge devices may be constrained in terms of bandwidth available for communication or data transfer, and energy useable to power the edge devices. The communication means and energy may therefore require optimization. In one aspect, the present subject matter discloses privacy preservation mechanism for distributed computation using edge devices distributed over a geographical region.

In one aspect, the edge device may be connected to a master node. The master node can be defined as a computer node that is configured to receive data, perform processing and execute preset instructions, having high processing capability. The communication network/gateway between the edge devices and the master node may be constrained in terms of available bandwidth and energy. It shall however be acknowledged that there may be one or more master nodes at a given point of time managing multiple clusters of backend server nodes and edge devices in an hierarchical manner. Also, it shall be understandable that at a given instance an edge device may itself act as a master node managing devices below it in an hierarchical order, depending on the application and their computational capability.

In one aspect of the disclosure, data is shared between the master node and the edge devices such that a low overhead communication and computation is achieved. Thus, whenever the data is shared between the master node and the edge devices 104, irrespective of where the data originates from, a communication means broadcasts the messaging/group communication among the edge devices thereby utilizing available network bandwidth optimally. The communication means may further compress the data by randomized network encoding technique to optimize network bandwidth and energy usage during such data transfer to the edged devices. The energy usage for the edge devices may also be optimized by establishing a relation between the length of coded data and number of edge devices receiving the data in a distributed environment. The communication means of the present disclosure thus enables reduction in network traffic, collaboration amongst the participating edge nodes and dynamic utilization of unused network capacity.

The master node according to the disclosure may be defined as a computer node with high processing capability, configured to receive data, perform processing and execute pre-set instructions. As will be acknowledged by those skilled in the art, there may be one or more master nodes at a given point of time managing multiple clusters of backend server nodes and edge devices in an hierarchical manner. Further, an edge device may itself act as a master node at certain points of time managing devices below itself in the hierarchy depending on the application and their computational capability. The master node based on permission granted by the user of the edge device may be configured to capture information pertaining to usage pattern of the edge device, computation speed, memory size, network connectivity and load request from the edge device. The master node can also be further configured to provide feedback to the user of the edge device participating to form the grid about their usage pattern and statistics of grid activity. The master node may further be configured to estimate computation capability of edge device based on the information captured. The master node based on given task deadline for the computation may create a list of partitions and dataset size for analysis by each of available edge device in the grid. The list of partitions and dataset size created by the master node may also take into consideration usage pattern based prediction, and location of the edge device.

According to the present disclosure, the master node may further be enabled to detect edge node failure. The master node may further partition data into smaller data sets. These smaller data sets can then be analysed in parallel by the available edge devices. The master node according to an embodiment of the present disclosure may schedule the computation of the smaller data sets using the communication means in order to optimize the load distribution with bandwidth and energy usage. On completion of said computation, the master node may combine final data sets received from the edge devices to output the final result.

According to an embodiment of the present disclosure, and as discussed whenever the master node distributes/segregates data between participating edge devices for computation, the privacy of the data may be required to be preserved/protected. Based on the privacy requirement of the data a privacy preserving method, selected from data aggregation, or perturbation, may be employed.

According to an embodiment of the present disclosure, the privacy requirement/measurement may be obtained by performing analysis on the computation capability of the edge device, the privacy-utility requirement and sensitive content of the data. While the privacy requirement is gathered from the data source in an interactive manner, the utility requirements are gathered from data sink or the end user in an interactive manner.

According to an embodiment of the present disclosure, if privacy-utility requirement and sensitivity analysis of the data indicate higher strength privacy preservation (equivalent to more data perturbation), preferably an edge device with higher computational power is chosen to carry out such operation. If engaging such an edge device is not feasible, then the privacy preservation scheme is optimized in a manner to match the computational capability of best possible edge device. In another extreme, when computational requirement of privacy preservation scheme is low, low computational powered edge device can be chosen.

While aspects of described device, and method for distributed computation, wherein a plurality of edge devices are used for distributed computation may be implemented in any number of different computing systems, environments, and/or configurations, the embodiments are described in the context of the following exemplary device.

Referring now to FIG. 1, a distributed computation environment 100 for a master node 102 is illustrated, in accordance with an embodiment of the present subject matter. In one embodiment, the master node 102 enables the distribution of data within a distributed computation environment. The master node 102 according to an embodiment utilizes non-dedicated edge devices such as residential gateways and smart phones for processing the data.

Although the present subject matter is explained considering that the master node 102 is implemented on a server, it may be understood that the master node 102 may also be implemented in a variety of computing systems, such as a laptop computer, a desktop computer, a notebook, a workstation, a mainframe computer, a server, a network server, and the like. Further, the master node can reside in smart phone or other portable device having higher computation capabilities. It will be understood that the master node 102 may be accessed by multiple users through one or more edge devices 104-1, 104-2 . . . 104-N, collectively referred to as edge devices 104 hereinafter, or applications residing on the edge devices 104. Examples of the edge devices 104 may include, but are not limited to, a portable computer, a personal digital assistant, a handheld device, and a residential gateway. The edge devices 104 are communicatively coupled to the master node 102 through a communication network 106. In one implementation, the communication network 106 may be a wireless network, a wired network or a combination thereof. The communication network 106 can be implemented as one of the different types of networks, such as intranet, local area network (LAN), wide area network (WAN), the internet, and the like. The communication network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the communication network 106 may include a variety of network devices, including routers, bridges, servers, computing devices, storage devices, and the like.

According to another implementation the communication network 106 may be a constrained communication network; the constraints may relate to bandwidth and energy available to the communication network 106. The constrained communication network according to an implementation may be selected from residential gateways, or smart phone gateways.

Figure 2:
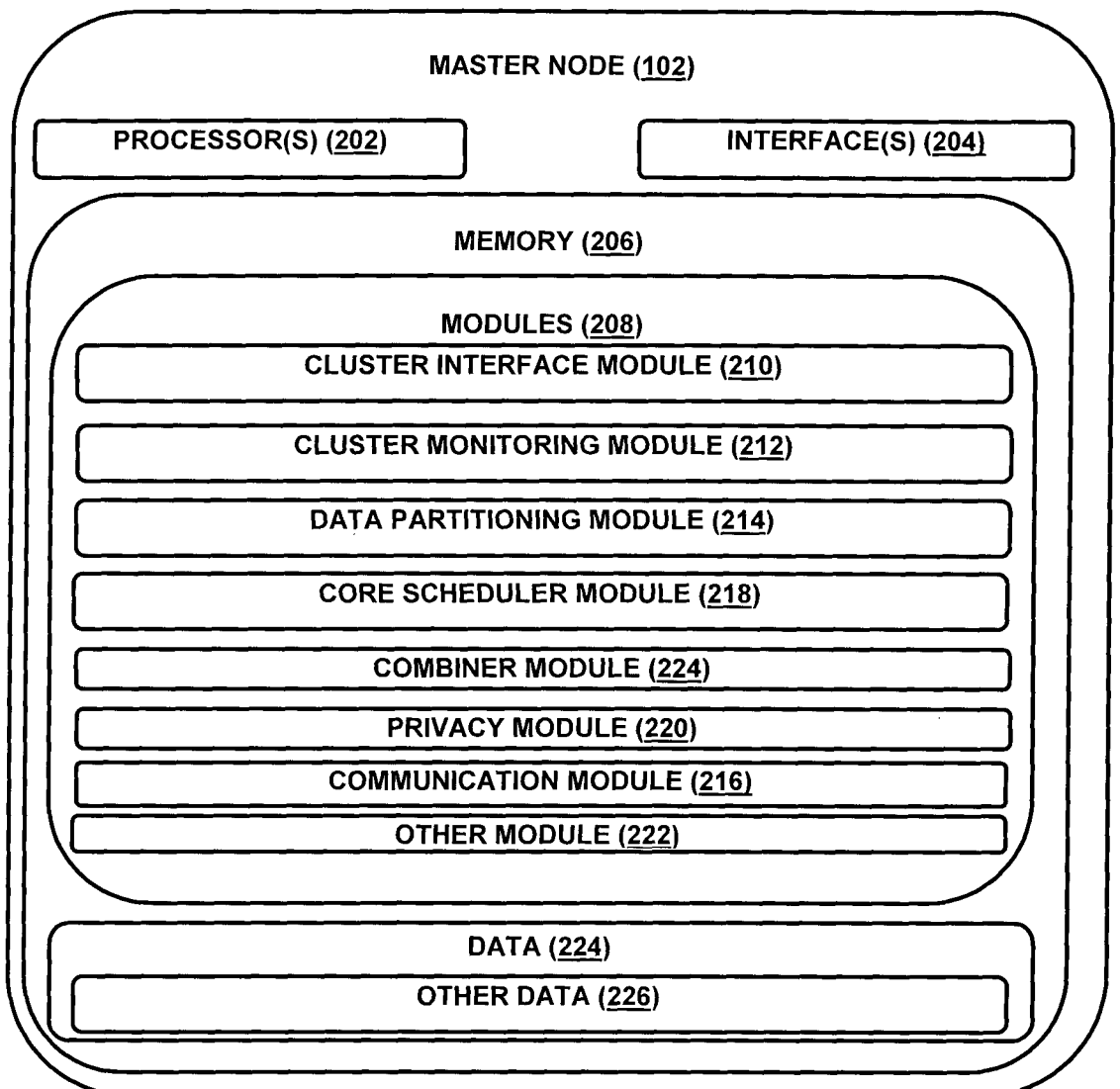
FIG. 2 illustrates a block diagram illustrating the device in accordance with an embodiment of the present disclosure.

Referring now to FIG. 2, a master node 102 is illustrated in accordance with an embodiment of the present subject matter. In one embodiment, the master node 102 may include at least one processor 202, an input/output (I/O) interface 204, and a memory 206. The at least one processor 202 may be implemented as one or more microprocessors, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the master node 102 to interact with a user directly or through the edge devices (Not Shown). Further, the I/O interface 204 may enable the master node 102 to communicate with other devices using the communication network 106. The I/O interface 204 can facilitate multiple communications within a wide variety of networks and protocol types, including wired networks, for example, LAN, cable, etc., and wireless networks, such as WLAN, cellular, or satellite. The I/O interface 204 according to an embodiment may perform as the constrained communication network 106; the constraints may relate to bandwidth and energy available to the communication network 106.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, and flash memories. The memory 206 may include modules 208 and data 224.

The modules 208 include routines, programs, objects, components, data structures, etc., which perform particular tasks or implement particular abstract data types. In one implementation, the modules 208 may include a cluster interface module 210, a cluster monitoring module 212, a data partitioning module 214, a core scheduler module 218, a combiner module 224 a privacy module 220, a communication module 216 and other modules 222. The other modules 222 may include programs or coded instructions that supplement applications and functions of the master node 102.

The data 224, amongst other things, serves as a repository for storing data processed, received, and generated by one or more of the modules 208. The data 224 may also include other data 226. The other data 226 may include data generated because of the execution of one or more modules in the other module 222.

According to an embodiment of the present disclosure, a grid for distributed computing may be created using residential gateways and smart phones as edge devices 104. The present embodiment enables tapping of the processing power of the edges devices 104 for distributed computing. The distributed computing using edges device such as smart phones and residential gateways enable the user to harness capacity of non-dedicated edge devices for computing thereby reducing the cost and time consumed for computation. The communication module 216 optimizes usage of available bandwidth and energy of the edge devices 104 thereby enabling the use of residential gateways and smart phones as edge devices 104. The communication module 216 may compress the data, requiring computation, by randomized coding to optimize the data transfer. Further, the communication module 216 may optimize the energy usage of the edge devices 104 by preserving relation between length of coded data and number of edge devices 104 receiving the data in a distributed environment. The communication module 216 may further be configured to dynamically utilize, unused network capacity of the constrained communication network 106.

According to embodiment of the present disclosure the cluster interface module 210 may be configured to capture information pertaining to the edge devices 104 participating in the grid generation. The information may pertain to computation speed, RAM size, CPU and RAM usage, network connectivity and load requested by the user. The cluster interface module 210 may be further configured to provide real-time or delayed feedback about usage of network connectivity and computation for the edge devices to users of the edge devices.

According to another embodiment the cluster interface module 210 may reside in the edge devices 104 and can be executed from the edge devices 104 upon request received from either the master node 102 or the users.

The cluster interface module 210, of the present device further provides the information captured by the cluster monitoring module 212. The cluster monitoring module 212, receives the information pertaining to edge devices in the grid. Based on the information captured the cluster monitoring module 212 estimates computation capabilities of the non dedicated edge devices. The cluster monitoring module 212 may further be configured to detect failures of edge devices during computation of a data. The cluster monitoring module 212 receives the data requiring computation. The cluster monitoring module 212 further creates a partition list for the data and maps the partition list with available edge devices 104. The cluster monitoring module 212 captures usage patterns of the edge devices 104 and updates the grid as and when new participating edge devices 104 join in.

The data partitioning module 214, segregates the data received by the cluster monitoring module 212 into smaller data sets. The segregation of the data into smaller data sets enables optimizing the bandwidth usage for the edge devices and also appropriates mapping of the data set with each edge device available based upon the list generated by the cluster monitoring module 212. The smaller data sets may vary in size. The size of the data set may be governed by the computation capability of the plurality of edge devices 104, and the network bandwidth available to the plurality of the edge devices 104 and other network channel characteristics.

The core scheduler module 218, upon receiving the smaller data set schedules the computation based on the availability of edge devices and time for computation. The combiner module 218 then eventually generates final result of the computation. The final result is based upon the aggregation of analysed data sets received from the edge devices upon completion computation.

According to the embodiment, the privacy module 220 may be configured to provide privacy measurement. The privacy measurement may be determined by performing analysis on the computation capability of the edge device, the privacy-utility requirement and sensitive content of the data. Further, the privacy module 220 enables complete privacy preservation or selective privacy preservation. The privacy preservation may be based upon computation capability of the at least one edge device from the plurality of edge devices, privacy-utility requirement, and the sensitivity of data.

Figure 3:
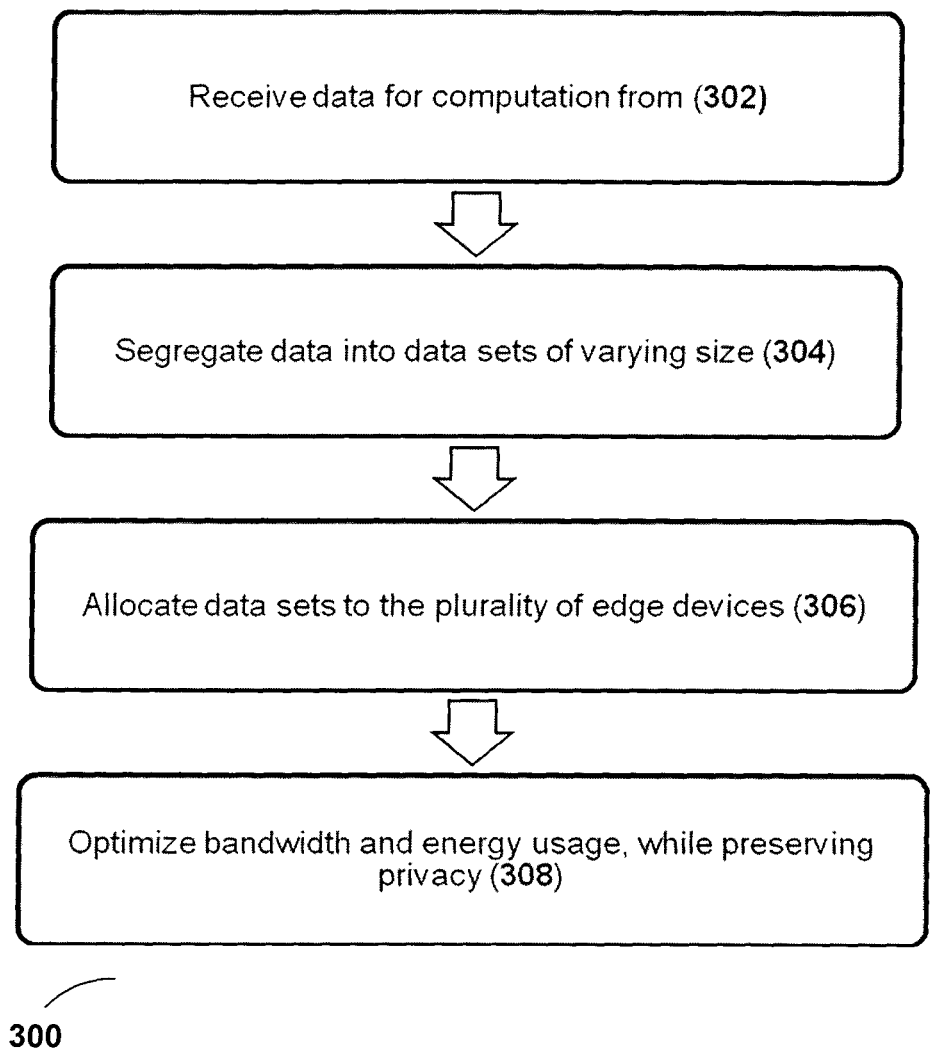
FIG. 3 illustrates a flow chart illustrating a method in accordance with an embodiment of the present disclosure.

Now referring to FIG. 3, the flow chart illustrates a method for distributed computation 300, wherein a plurality of edge devices are used for distributed computation in accordance with an embodiment of the present disclosure. At block 302, data is received at the mater node 102 by the cluster monitoring module 212. The data received may originate from at least one edge device selected from the plurality of edge devices 104.

Next, at block 304 the data received for computation is segregated into smaller data sets by the data partitioning module 214. The smaller data sets may vary in size. The size of the data set may be governed by the computation capability of the plurality of edge devices estimated by the cluster monitoring module 212, and network characteristics such as the bandwidth available to the plurality of the edge devices and round trip latency, estimated by the communication module 216. At block 306 the smaller data sets are allocated to the plurality of edge devices by the core scheduler module 218. The core scheduler module 218 enables scheduling for the computation of the data based on the list of partitions and the size for the smaller data sets created by the cluster monitoring module 212. The allocation further comprises scheduling of the data schedule by core scheduler module 216 for analysis based on the list of partitions, available edge devices, available bandwidth, and other network channel characteristics such as latency. This further enables appropriate privacy preservation thereby maintaining a relationship among the size of scheduled data, network channel characteristics (such as bandwidth, latency), state of the device (idle, active), corresponding available energy levels, and appropriate privacy preservation scheme.

At block 308, bandwidth and energy usage of the plurality of edge devices is optimized for efficient computing during the allocation. This facilitates exchange of information amongst the plurality of edge devices 104 in the master node 102, between the edge devices and the master node 102, and amongst the edge devices 104 themselves as a process of collaborative computing. According to an exemplary embodiment, the optimization for usage of the bandwidth and energy is achieved by enabling efficient group communication scheme (broadcasting the messaging/group communication) among the edge devices 104 thereby utilizing available network bandwidth optimally. Further optimization may achieved by compressing the data via randomized network encoding technique prior to data transmission.

According to the exemplary embodiment, energy usage for the edge devices 104 and efficient load distribution during data compression may be achieved by preserving a relation between length of coded data and number of edge devices receiving the data in distributed environment.

Although implementations for method and device for enabling resource usage optimization of resource constrained sensors have been described in language specific to structural features and/or methods, it is to be understood that the appended claims are not necessarily limited to the specific features or methods or advantages described. Rather, the specific features and methods are disclosed as examples of implementations for distributed computing environments engaging plurality of edge devices.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A system for distributed computation in a communication network, the system comprising:
   a processor;
   a memory coupled to the processor, wherein the memory comprises a plurality of modules
   capable of being executed by the processor, and wherein the plurality of modules
   comprising:
   a cluster monitoring module configured to receive information pertaining to a plurality of edge devices in a grid, the received information used for estimating computation capabilities of one or more non-dedicated edge devices, wherein the cluster monitoring module is further configured to create a partition list for data and maps the partition list with the plurality of edge devices, and wherein the cluster monitoring module captures one or more usage patterns of the plurality of edge devices and updates the grid when one or more new participating edge devices join the grid;
   a privacy module configured to
   provide privacy measurement by performing sensitivity analysis on the computation capability of at least one edge device of the plurality of edge devices and sensitive data content, wherein the privacy measurement is based on at least one factor selected from a computation capability of the at least one edge device from the plurality of edge devices, a privacy utility requirement and sensitivity of the data;
   a data partitioning module configured to segregate the data into smaller data sets and apply a privacy preservation mechanism based on the privacy measurement of the data, wherein the data partitioning module facilitates optimization of bandwidth usage for the plurality of edge devices and appropriates mapping of the smaller data sets with each edge device among the plurality of edge devices based upon the partition list created by the cluster monitoring module; and
   a communication module configured to
      transfer the data to the plurality of edge devices for efficient load distribution during computation and to preserve privacy;
   optimize bandwidth usage and energy consumption of the plurality of edge devices, during the transfer of the data over the communication network, the plurality of edge devices including one or more residential gateways, wherein the bandwidth usage and energy consumption is optimized by compressing the data by network encoding the data prior to the transfer of data, and
   preserve a relation between length of coded data and number of edge devices receiving the data, wherein the communication module is further configured to reduce traffic via a group communication based communication scheme, to collaborate among the plurality of edge devices, and to dynamically utilize unused network capacity of the communication network;
   a cluster interface module configured to provide feedback in at least one of a real time and a delayed mode, wherein the feedback is related to at least of usage of network connectivity and computation for the plurality of edge devices; and
   a core scheduler module configured to allocate one or more smaller data sets to the plurality of edge devices, wherein the core scheduler module is further configured to schedule computation of data based on a list of partitions and size of the one or more smaller data sets, and wherein the allocation comprises scheduling of a data schedule for analysis based on the list of partitions, available edge devices, available bandwidth and latency.

2. The system of claim 1, wherein the cluster monitoring module is further configured to create a list of partitions and the size for the smaller data sets, and detect failure of edge devices from the plurality of edge devices.

3. A processor implemented method for distributed computation in a communication network, the method comprising:
   receiving by a processor information pertaining to a plurality of edge devices in a grid, the received information used for estimating computation capabilities of one or more non-dedicated edge devices;
   creating, by the processor a partition list for data and mapping the partition list with the plurality of edge devices, and further capturing one or more usage patterns of the plurality of edge devices and updating the grid when one or more new participating edge devices join the grid;
   providing privacy measurement by the processor, wherein the privacy measurement is determined by performing sensitivity analysis on the computation capability of at least one edge device of the plurality of edge devices and sensitive data content, wherein the privacy measurement is based on at least one factor selected from a computation capability of the at least one edge device from the plurality of edge devices, a privacy utility requirement and sensitivity of data;

segregating, by the processor the data into smaller data sets and apply a privacy preservation mechanism based on the privacy measurement of the data, wherein the segregation facilitates optimization of bandwidth usage for the plurality of edge devices and appropriates mapping of the smaller data sets with each edge device among the plurality of edge devices based upon the partition list;

transferring the data to the plurality of edge devices for efficient load distribution during computation and preserving privacy;

optimizing, by the processor, bandwidth usage and energy consumption of the plurality of edge devices, during the transfer of the data over the communication network the plurality of edge devices including one or more residential gateways, wherein the bandwidth usage and energy consumption is optimized by compressing the data by network encoding the data prior to the transfer of data; and preserving, by the processor a relation between length of coded data and number of edge devices receiving the data;

reducing, by the processor, traffic via a group communication based communication scheme, to collaborate among the plurality of edge devices, and dynamically utilizing unused network capacity of the communication network;

providing, by the processor feedback in at least one of a real time and a delayed mode, wherein the feedback is related to at least of usage of network connectivity and computation for the plurality of edge devices (104); and allocating one or more smaller data sets to the plurality of edge devices by the core scheduler module, wherein the core scheduler module is further configured to schedule computation of data based on a list of partitions and size of the one or more smaller data sets, and wherein the allocation comprises scheduling of a data schedule for analysis based on the list of partitions, available edge devices, available bandwidth and latency.

\* \* \* \* \*